United States Patent [19]
Blum et al.

[11] 3,993,653
[45] Nov. 23, 1976

[54] CELL FOR ELECTROLYSIS OF STEAM AT HIGH TEMPERATURE

[75] Inventors: Pierre Blum, Grenoble; Jean-Claude Viguie, Eybens, both of France

[73] Assignee: Commissariat a l'Energie Atomique, Paris, France

[22] Filed: Dec. 23, 1975

[21] Appl. No.: 643,830

[30] Foreign Application Priority Data
Dec. 31, 1974  France .............................. 74.43491
Nov. 21, 1975  France .............................. 75.35664

[52] U.S. Cl. ............................... 204/272; 204/129; 204/278; 204/284; 204/290 F
[51] Int. Cl.² ....................... C25B 9/00; C25B 11/03
[58] Field of Search ........ 204/129, 283, 284, 290 R, 204/291, 293, 272, 278, 290 F; 136/146, 86 R, 153

[56] References Cited
UNITED STATES PATENTS

| | | |
|---|---|---|
| 2,193,323 | 3/1940 | Nitzschike et al. ............. 204/272 X |
| 2,363,386 | 11/1944 | Bock ............................... 204/272 X |
| 3,291,714 | 12/1966 | Hall et al. ........................... 204/256 |
| 3,316,163 | 4/1967 | Oser .................................... 204/129 |
| 3,364,077 | 1/1968 | Arrance et al. ..................... 136/146 |
| 3,462,314 | 8/1969 | Berger et al. ................. 136/86 R X |
| 3,553,092 | 1/1971 | Mund et al. ................. 204/290 F X |
| 3,632,498 | 1/1972 | Beer ............................... 204/290 F |

Primary Examiner—John H. Mack
Assistant Examiner—A. C. Prescott
Attorney, Agent, or Firm—Cameron, Kerkam, Sutton, Stowell & Stowell

[57] ABSTRACT

The cell comprises a structure of superposed film layers with at least two metallic elements insulated from each other for the supply of current to a cathode and to an anode. The cathode is formed by a porous cermet substrate coated with a thin film of solid electrolyte which consists of a mixture of refractory oxides in solid solution and which is in turn coated with a porous deposit constituting the anode. Current drainage between the metallic elements and the cathode and the anode is obtained on each side of the solid electrolyte by means of thicknesses of a conductive sponge.

28 Claims, 7 Drawing Figures

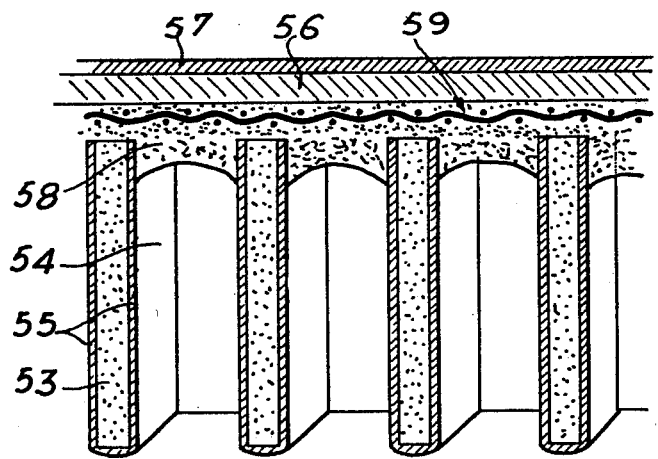
FIG. 6
FIG. 7
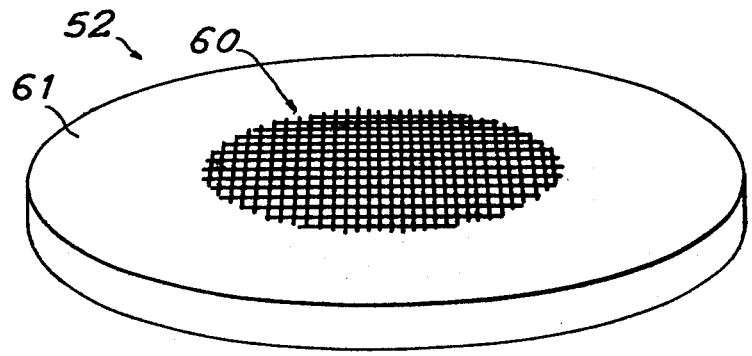

CELL FOR ELECTROLYSIS OF STEAM AT HIGH TEMPERATURE

This invention relates to a cell for the continuous electrolysis of steam at high temperature, especially for the production of hydrogen gas.

As is already known, hydrogen requirements are of considerable magnitude and importance both in the mineral and organic chemical synthesis industry and also in some steel-production applications such as the direct reduction of iron ore. In point of fact, practically the entire quantity of the hydrogen employed for such purposes is at present obtained by reforming of the natural gas. At a time of rising prices of this raw material, the methods involving electrolytic dissociation of water would be of major interest if it were possible to achieve a considerable increase in power efficiency from its present value of the order of 50% to a maximum of 80% or more. Although conventional techniques for the electrolysis of water in the liquid state appear to be limited in this respect, calculation and experience have shown that it is actually a completely different matter when methods are employed for the electrolysis of steam at high temperature of the order of 800° to 1000° C in electrolytic cells in which the electrolyte consists of an oxide in solid form which has the property of conducting the electric current by means of the anions of its crystal lattice.

In a number of practical designs of cells of this type which have been known up to the present time, the electrolyte is placed between two electronic conductors or electrodes which perform respectively the function of cathode and anode, these latter being enclosed within isolated compartments in which the hydrogen and the oxygen produced by dissociation of the steam are collected. In these known designs, however, the efficiency obtained is still of a low order by reason of the overvoltages at the electrodes and the voltage drop resulting from the internal ohmic resistance of the cell. Moreover, problems arise when connecting these electrodes to the current supply and also when coupling together a number of cells of this type since each cell is capable of withstanding only a limited current density and consequently of producing only a limited output of gas.

Finally, in these designs which are known at the present time, further problems of a technological order arise in the manufacture of an electrolyte of material having high electrical conductivity which does not give rise in addition to oxidation-reduction reactions with the products of electrolysis. The electrolyte must also have satisfactory mechanical porperties at high temperature and must especially be capable of withstanding thermal cycling and shocks as well as temperature gradients. Furthermore, said electrolyte must be thermally stable and impermeable to gases, especially to hydrogen in spite of the very high diffusivity of said gas. Moreover, the electrodes employed in the cell must ensure excellent current drainage while also having high electrical conductivity as well as excellent properties of adhesion with respect to the electrolyte. In particular, said electrodes must have a coefficient of expansion which differs only to a slight extent from that of the electrolyte and finally must be chemically compatible with the gases produced by the electrolytic process.

All these conditions are combined to a very imperfect extent in designs which are known at the present time and result in cells which have low efficiency while entailing considerable capital outlay by reason of their generally prohibitive space requirements and leading in the final analysis to unacceptable operating costs.

This invention is directed to a cell for the electrolysis of steam at high temperature which makes it possible on the contrary to produce a particularly high power efficiency with a technological design concept which limits the overall size of the cell without thereby entailing excessive capital costs.

To this end, the cell under consideration comprises a structure consisting of superposed film-layers with at least two metallic elements insulated from each other for the supply of current respectively to a cathode and to an anode and is distinguished by the fact that the cathode is formed by a substrate of a porous cermet to which is applied a thin film of solid electrolyte constituted by a mixture of refractory oxides in solid solution, said film of electrolyte being in turn coated with a porous deposit constituting the anode, current drainage between the metallic elements and the cathode and the anode being obtained on each side of the solid electrolyte by means of thicknesses of a conductive sponge.

The invention is thus primarily directed to the construction of a cell having the appearance of a laminated structure in which the solid electrolyte film-layer is in internal contact on the one hand with a cathodic substrate and on the other hand with an anodic film layer having open porosities which promote gaseous exchanges while limiting ohmic voltage drops, there being incorporated in the substrate, the electrolyte and the anodic film layer a refractory oxide which is stabilized by a second oxide, said mixture of oxides being completed by suitable additions in the case of both the cathode and the anode. The use of a material of this type offers an advantage in that it is not conductive to parasitic reactions with the products of electrolysis while additionally exhibiting high electron conductivity. Drainage of current between the cathode and the anode and respectively the current supply elements by means of conductive sponges achieves a significant reduction of resistive losses at the connections while improving the power efficiency of the cell to a corresponding extent, said sponges being intended to ensure a permanent electrical contact with the matallic current supply elements.

To this end and in accordance with various secondary characteristic features of the invention which are preferably to be considered in combination but may be considered separately if necessary, the cell can advantageously utilize the following arrangements:

the mixture of refractory oxides of the solid electrolyte is formed by dissolving a substance selected from calcium oxide, yttrium oxide, cerium oxide or a rare-earth oxide in zirconium dioxide ($ZrO_2$). In a particular embodiment, the oxide mixture corresponds to the formula:

$[xZrO_2, (1 - x) CaO]$,
with $0.85 \leq x < 0.88$.

the mixture of oxides receives an addition of nickel in order to form the porous cement of the cathode.
the anode is formed by a mixture of oxides containing stannic oxide, indium oxide or antimony oxide. By way of alternative, the anode is constituted by a layer of silicon carbide and contains precious metals if necessary.

the metallic current-drainage sponges are formed by means of an alloy having a base of nickel and chromium which is suitably divided.

In a first embodiment of the invention, the cell under consideration has a geometry of revolution in the form of a glove finger which is closed at one end and is provided from the axis towards the periphery with an open central metallic tube which serves to supply current to the cathode and through which is circulated the steam to be electrolyzed, a first thickness of metallic sponge placed against the external surface of the central tube and extending beneath the extremity of said tube, an inner glove finger of porous cermet, one face of which is applied against the first thickness of metallic sponge and the opposite face of which is coated with a thin film of solid electrolyte, said film being in turn coated externally with a porous deposit which constitutes the anode, a second thickness of metallic sponge applied against the anode and finally an outer metallic casing tube in the form of a glove finger for supplying current to the anode.

The space formed between the central tube and the outer casing tube is preferably divided into two compartments by means of a coaxial collar having two parallel shouldered portions rigidly fixed respectively to two flanges formed on the tube and the casing with interposition of a seal, said collar being such as to form an extension of the inner glove finger of porous cermet which forms the cathode by means of a metallic bellows seal, the compartments being intended to communicate respectively with two pipes for the discharge of hydrogen and oxygen produced by electrolysis of the steam.

The central tube is advantageously associated at the open end thereof within the cell with a spacer member of refractory material for centering said tube with respect to the glove finger of porous cermet.

In another alternative embodiment, the cell comprises a stack of unitary cells mounted between two parallel metalic current-supply plates. Each unitary cell comprises successively a first thickness of metallic sponge, a film layer of porous cermet constituting the cathode in contact with a thin film of electrolyte which is in turn coated with a porous deposit forming the anode, a second thickness of metallic sponge and a conductive plate, the lateral spaces located on each side of the cathode and of the anode being so arranged as to constitute on one side a collector for supplying the steam and on the other side discharge collectors for the hydrogen and the oxygen produced.

In another embodiment, the porous cermet substrate of the cathode is constituted by a refractory support block having a compartmented structure in which the compartments are delimited by substantially prismatic internal spaces of substantial length which extend through the structure, the walls of said compartments being coated with a thin film of conductive metal having a constant thickness. As an advantageous feature, said support block has a honeycomb structure or the like and said compartments can have a cross-section which is hexagonal, square or of any other desired shape, Depending on requirements, the support block is in contact with the solid electrolyte film layer by means of a coating of porous metal of small thickness which seals-off the ends of the compartments. Alternatively, the connection between the solid electrolyte and the thin film of the wall of the compartments is formed by a fine-mesh wire fabric element placed against a contact face of the support block and embedded in a thin layer of porous metal.

Depending on requirements, the porous cermet support block of the cathode is formed of refractory material of the type consisting of stabilized zirconium, magnesium aluminate (spinel) or natural aluminum silicate (mullite) and has a thickness of approximately 5 mm, the thin film formed on the walls of the compartments of the block being of nickel having a thickness of the order of 0.1 mm.

As an advantageous feature, the collectors of the cell are insulated at the level of the porous cermet film layer of the cathode by means of an annular insulating plate. The cathode is maintained in position by means of a metallic bellows seal which is in turn connected to a metallic ring. By way of alternative, the porous cermet support block of the cathode has a recessed central zone and a solid or non-porous peripheral zone which directly ensures leak-tightness of the cell collectors.

The conductive sponges can be constituted by an interlaced assembly of thin resilient wires which form a spring and ensure a satisfactory electrical contact between current supply leads and electrodes.

Said sponges are consequently formed of materials which have good electrical conductivity, which offer satisfactory characteristics of elasticity at the utilization temperature in the vicinity of 900° C, and which afford resistance to corrosion by oxygen, hydrogen and steam. The structure of these sponges must also be sufficiently aerated to introduce only a minimum pressure drop in the case of the gases which circulate through these latter.

In order to fabricate sponges of this type, there can preferably be chosen refractory alloys having a base of nickel, chromium, nickel and chromium or molybdenum or finally composite fibers of carbon and/or silicon carbide.

Thus, the known alloys designated by trade names such as "Inconel" (Ni—Cr—Fe), "Incoloy" (Ni—Cr—Fe), "Nimonic" (Ni—Cr—Co) or "NS30" steel may suitably be employed in the fabrication of said sponges. These latter can also be formed of molybdenum silicide.

Finally, it is possible in the stack system to make profitable use of the flat structure of the cell elements in order to incorporate blade springs or coil springs in these sponges so as to ensure that these latter are more effectively applied against oppositely-facing portions.

Further properties of an electrolytic cell as constructed in accordance with the invention will become apparent from the following description of two exemplified embodiments which are given by way of indication without any limitation being implied, reference being made to the accompanying drawings, wherein:

FIG. 6 illustrates the use of another embodiment;

FIG. 7 is a sectional view of a further alternative embodiment.

Figure 1:
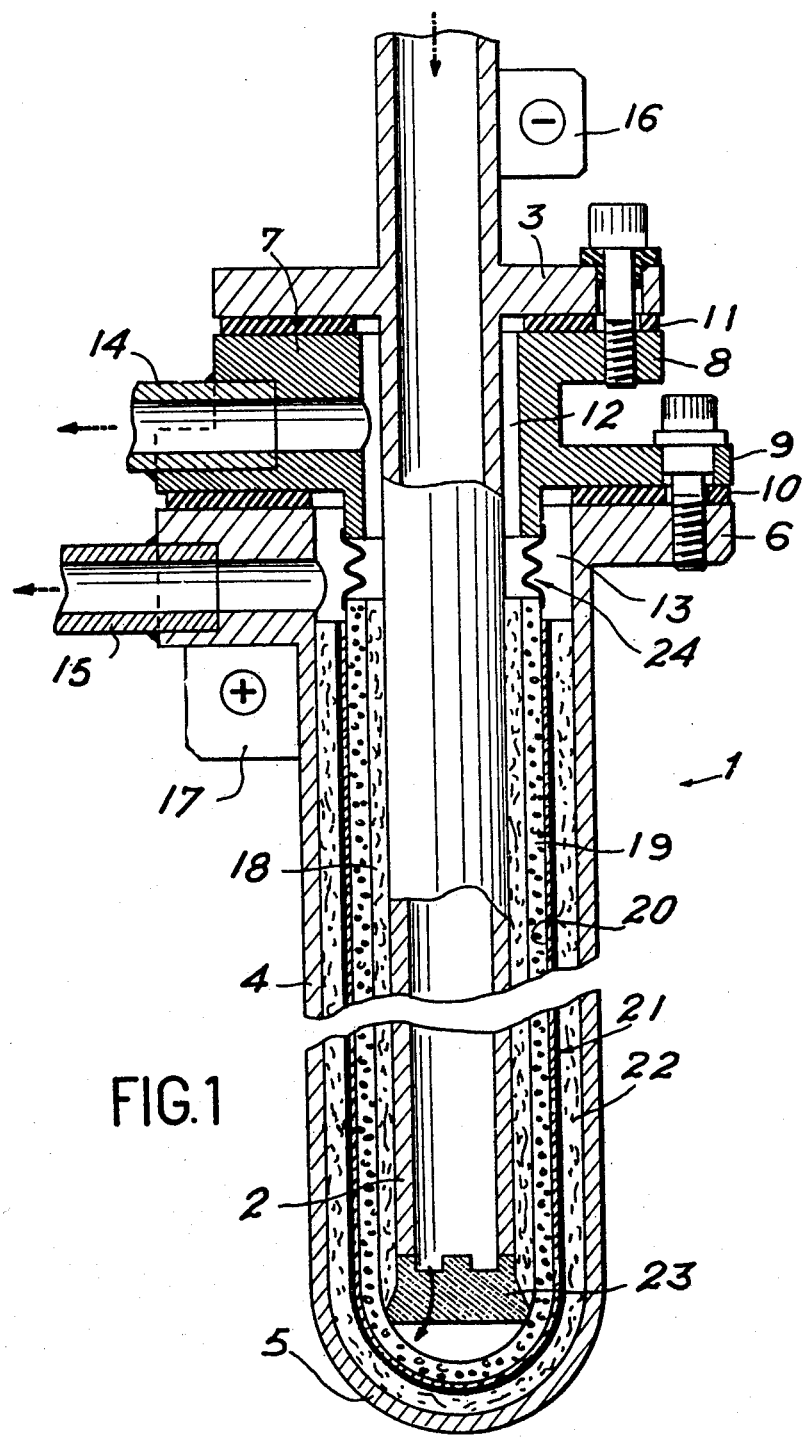
FIG. 1 is a diagrammatic axial sectional view of an electrolytic cell in accordance with a first embodiment of the invention in which the geometry is that of a glove finger of revolution about an axis.

As shown in FIG. 1, the cell under consideration has the general shape of a glove finger having a diameter of the order of 3 cm and a length in the vicinity of 100 cm. This cell comprises a central metal tube 2 formed especially of copper and open at that end which penetrates into the interior of the cell. Said tube is intended on the one hand to serve as a current supply terminal and on the other hand as a pipe for the introduction of the high-temperature steam to be electrolyzed. Said tube 2 is provided externally of the active portion of the cell described hereinafter with a transverse shouldered portion 3 and is placed in coaxial relation with an outer casing tube 4 having a closed bottom portion 5. Said metal tube 4 is usually formed of copper provided with the same internal protective coating as the tube 2 or of an alloy such as Inconel and also has a transverse end flange 6 which is parallel to the shouldered portion 3. There is mounted between these two flanges a sealing collar 7 which isolates the internal region of the cell from the exterior and is provided with two flanges 8 and 9 respectively which are capable of cooperating with the shouldered portion and the flanges 3 and 6 of the tubes 2 and 4 and between which are clamped seals 10 and 11. The collar 7 forms a separation between the tubes 2 and 4 for two coaxial compartments 12 and 14 respectively which perform the function of gas collectors, in particular for the hydrogen and oxygen derived from electrolytic dissociation of the steam, these gases being discharged from said compartments through pipes 14 and 15. Electric current is supplied to the cell by means of two connecting terminals 16 and 17 respectively which are connected to the negative pole and to the positive pole of a direct-current voltage supply (not shown), the terminal 16 being rigidly fixed to the tube 2 externally of the cell and the terminal 17 being rigidly fixed to the casing tube 4 by means of the pipe 15.

The electrolytic cell proper is then formed by a superposed assembly of thin film layers mounted between the tubes 2 and 4. From the tube 2 to the tube 4, said cell thus comprises a first thickness 18 of a metallic sponge constituted by a suitably divided refractory alloy having a base in particular of nickel and chromium, said thickness 18 being intended to be applied against the external surface of the tube 2 so as to establish a good electrical contact with this latter and to project to a short distance beneath the extremity of said tube. Said first thickness 18 is surrounded by a layer 19 of a porous cermet having the shape of a glove finger which extends parallel to the wall of the tube 4, especially to the lower end 5, and forms an extension of the collar 7 within the space located between the tubes 2 and 4. Said layer 19 of porous cermet is preferably formed by a mixture of nickel and a mixed oxide of calcium (CaO) and of zirconium ($ZrO_2$) and constitutes the cathode of the cell. The external surface of said layer 19 carries a thin film 20 of a solid electrolyte formed in the example of construction under consideration by the same dissolution of calcium oxide in proportions such that the calcium oxide represents between 12 and 15% of the mixture. The anode 21 of the cell is then deposited against said thin film 20 of electrolyte which has a thickness in particular of the order of 100 microns, in the form of a thin and porous coating of another cermet formed by the addition to the same mixture of oxides (CaO, $ZrO_2$) of a substance such as indium oxide doped with stannic oxide or antimony oxide doped with stannic oxide. Finally, the anodic film layer 21 is in turn covered with a second thickness of metallic sponge 22 which is of the same type as the thickness 18, that is, which is formed by an alloy of nickel and chromium, this second thickness 22 being in intimate contact with the internal surface of the casing tube 4 which supplies current to the anode. The different layers of the cell are centered relative to each other by means of an alumina spacer member 23 mounted at the lower end of the central tube 2, leak-tightness between the cathode compartment 12 and anode compartment 13 being ensured between the extremity of the collar 7 and the layer 19 of porous cermet by means of a metallic bellows seal 24 formed especially of Inconel.

Figure 2:
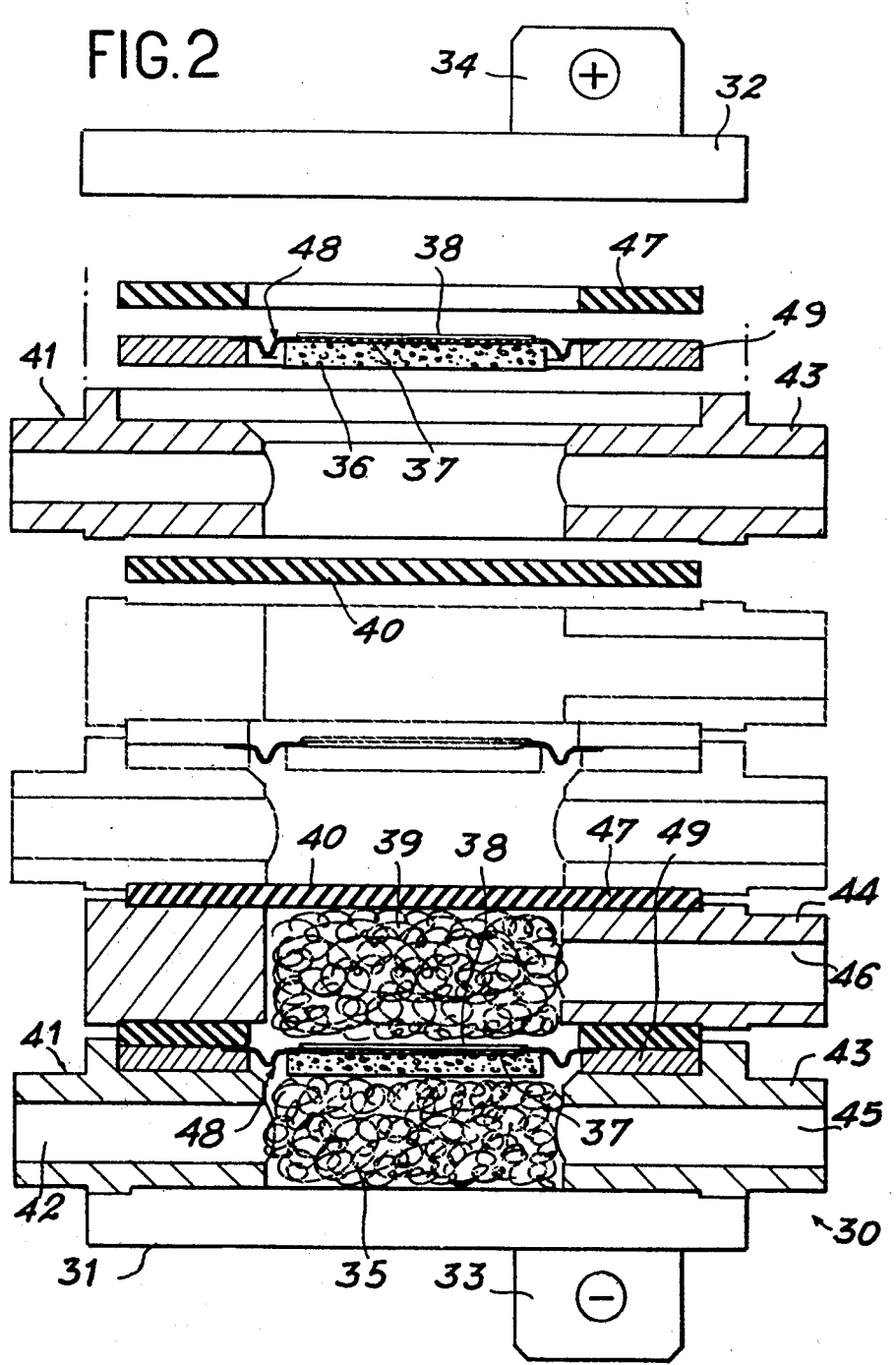
FIG. 2 is a sectional view of an alternative embodiment consisting of a structure in the form of superposed flat layers.

In another alternative embodiment which is illustrated in FIG. 2, the electrolytic cell under consideration as generally designated by the reference 30 has a structure consisting of flat layers formed by a stack of superposed unitary cells. Said cell comprises two metallic front plates 31 and 32 which are usually formed of Inconel and serve to supply current to the cell, said plates being provided for this purpose with two terminals 33 and 34 for establishing a connection with a suitable direct-current voltage supply. A first thickness 35 of a metallic sponge is placed against the central portion of the front plate 31 and a layer 36 of a porous cermet which constitutes the cathode is placed against said thickness 35. Said layer 36 is covered on its opposite surface with a thin deposit 37 of a solid electrolyte and this latter is in turn coated with a porous thin film 38 which constitutes the anode. Finally, the anode itself is in contact with a second thickness 39 of a metallic sponge which has the same composition as the first thickness 35 and is in turn applied against a conductive plate 40. Said conductive plate 40 serves to supply the double-polarity current as in a conventional series circuit. The material employed must be compatible with the two gases produced and may accordingly consist of Inconel, for example. Preferably, the materials constituting on the one hand the anode, the cathode and the electrolyte and on the other hand the metallic sponges for drainage of the current are identical with those contemplated in the first alternative embodiment which was described with reference to FIG. 1.

The elements 35 to 40 constitute a unitary cell in the stack and the series connection of a given number of said unitary cells makes it possible to form production assemblies which are suitably adapted to the desired output. The steam to be electrolyzed is introduced into each unitary cell by means of an intake collector 41 connected to a duct 42 and located opposite to the thickness 35 of the metallic sponge. The gaseous products, especially hydrogen and oxygen, are discharged at the end remote from the collector 41 through two further collectors 43 and 44 by means of discharge ducts 45 and 46. Leak-tightness at the level of the layer 36 of porous cermet is ensured by means of an insulating plate 47 and a metallic plate 49 which forms a separation between the collectors 43 and 44, the connection between said plate 49 and the layer 36 being established by means of a bellows seal 48 of nickel.

In either of the two alternative embodiments described in the foregoing, a major requirement for satisfactory operation of the cell consists in the possibility of discharging the gases produced at the electrodes as a result of electrolysis while also establishing the most intimate and reliable metallurgical bond between these electrodes and the solid layer of electrolyte.

To this end, the porous cermet substrate of the cathode is advantageously designed in the form of a recessed support having a compartmented structure of the honeycomb type or the like in which the cross-section of each compartment can be hexagonal, square or of any other desired shape. Adjacent compartments extend through the structure in a preferential direction which is parallel from one compartment to the next and usually perpendicular to two parallel faces of the block, one face of which is in contact with the solid electrolyte layer. The porosity of a compartmented structure of this type which measures the ratio of the solid portions to the vacant portions of the substrate can accordingly be considerably increased and in particular be made considerably greater that that of a porous cermet support obtained by powder assembly. Under these conditions, the hydrogen produced by electrolysis and collected at the cathode can be eliminated without any difficulty by permitting considerably enhanced efficiency of the cell.

Figure 3:
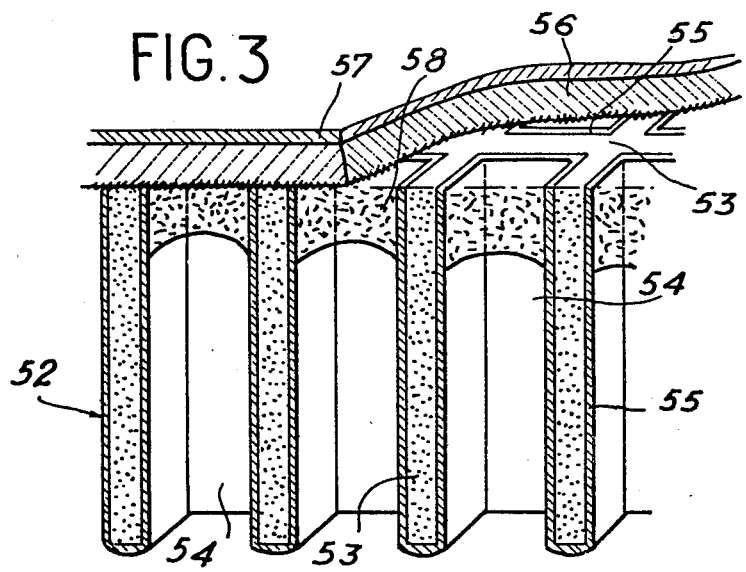
FIG. 3 illustrates a particular embodiment of the porous cermet substrate of the cathode.

FIG. 3 illustrates a first alternative design of a support block of this type as generally designated by the reference 52 and constituted by a porous cermet 53 which is preferably of stabilized zirconia, of spinel or of mullite having a thickness of approximately 3 to 4 mm. The block 52 is made up of an array of adjacent compartments 54 of substantial length, thus providing said block with a recessed structure which permits removal of the hydrogen produced as a result of the electrolytic process at the end corresponding to the cathode of the cell. The walls of the compartments are provided with a thin metallic coating 55 constituting the cathode proper and preferably formed of nickel deposited to a depth of the order of 0.1 mm by means of any known method which is suited to the composition of the cermet especially by spray-coating, vacuum, evaporation, diffusion, electrolysis or chemical reaction from a vapor phase, especially from carbonyl nickel.

Figure 4:
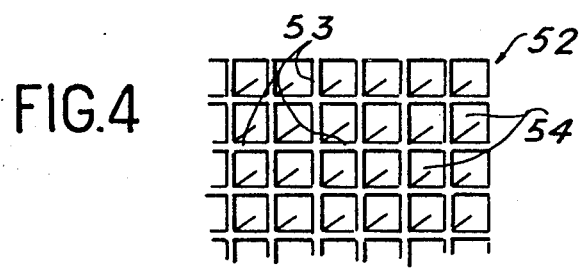
FIGS. 4 and 5 show two alternative forms of construction of the support block which is employed for the formation of said substrate.
Figure 5:
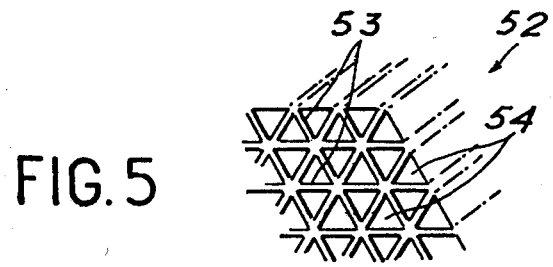

It is readily apparent that the support block 52 of porous cermet is provided with adjacent compartments 54 having a cross-section selected from a wide range of alternative configurations which is dependent in particular on the method of fabrication employed, the only essential requirement being to produce a very high void coefficient across the compartmented structure. As illustrated in FIGS. 4 and 5 respectively, said compartments 54 can have a cross-section of square or triangular shape but these latter are given solely by way of non-limitative example. One of the faces of the block 52 which forms a support for the cathode is in contact with a relatively thin film layer 56 of the order of 100 microns consisting of a suitable solid electrolyte and provided on its opposite face with a coating 57 which forms an anodic film layer; this small thickness of film layer facilitates the appearance of triple points in that surface which is in contact with the porous nickel coating deposited on the support block, said points being essential to the occurrence of the electrochemical reaction. There appear simultaneously at said triple points a zone of evolution of the hydrogen gas and a point of encounter between the layer of solid electrolyte and the electric current conducted by the nickel coating layer. The connection between the support block 2 of cellular or compartmented cermet and the film layer 56 of solid electrolyte is established by means of a porous metallic plug 58 formed especially of nickel and deposited to a depth of the order of 0.5 to 1 mm on the corresponding face of said support block 52. This deposit can be formed on the cellular support block 52 of porous cermet by any known method and especially by electrophoresis, by reactive evaporation from metal salts corresponding to the composition of the electrolyte layer under a pressure of a few torr, or alternatively by reactive vacuum sputtering from an alloy of said metals.

By way of alternative and as illustrated in FIG. 6, the plug 58 incorporates a fine-mesh wire fabric element 59 which improves its mechanical stability and its cohesion with the layer 56 of electrolyte. Said wire fabric element is placed against a contact face of the block 52 and embedded in a thin layer of porous nickel.

If so required, the support block 52 of porous cermet can be fabricated (as illustrated in FIG. 7) so as to have a recessed central zone 60 and a flat peripheral zone 61. This structure has a special advantage for ensuring leaktightness between compartments in the case of an electrolytic cell constructed in accordance with the embodiment shown in FIG. 2 and formed by the superposed assembly of flat adjacent elements arranged in pairs so as to define separate compartments provided respectively on the one hand for admitting steam and on the other hand for discharging the oxygen and hydrogen which are produced. The construction of the support block 52 can make use of any known fabrication technique which is conventional in powder metallurgy such as machining, spraying, extrusion, molding and so forth. Similarly, the deposition of a nickel coating on the honeycomb-typecompartments such as the layer formed on the contact face of the support block can be obtained by chemical deposition in solution, spraying, electrolysis, vacuum evaporation or alternatively by reaction from a vapor phase which can in this case be carbonyl nickel.

The film layer 56 is deposited as in the previous examples in the form of a mixture of refractory oxides, especially calcium oxide and zirconium oxide. However, the calcium oxide can be partly or entirely replaced in predetermined proportions by yttrium oxidem, cerium oxide or a rare earth or rare-earth oxide. Similarly, the anodic film layer 57 is also formed from a mixture of oxides containing tin, indium or antimony with possible inclusion of precious metals added by spray-coating so as to ensure better mechanical cohesion without limiting the porosity of the anode. By way of alternative, said anodic film layer can be formed of silicon carbide.

The methods employed for forming the anodic film layer can consist in known manner either in deposition of powders from a solution by settling followed by drying, coagulation by heating and surface metallizing or alternatively by reactive evaportion from salts of the corresponding metals under a pressure of a few torr or alternatively by reactive vacuum sputtering from an alloy of these metals.

Whatever embodiment may be adopted, the cell in accordance with the invention makes it possible to carry out electrolysis of steam at high temperatures with a particularly high power consumption efficiency which is appreciably higher than those produced by means of designs which are at present known. This increase in efficiency is due in particular to the drainage of electric current between the elements for supplying current to the cell and the cathode and the anode; said current drainage is performed by the conductive sponge layers and limits overvoltages at the electrodes to a considerable extent. Said sponge layers also exhibit very low electrical resistivity and introduce only a limited voltage drop in the operation of the cell. In the case of a high current density which can attain or even exceed 1 A/cm$^2$, said voltage drop does not exceed 150 millivolts.

It can be mentioned by way of indication that cells of this type which have a unitary surface area of the order of 400 cm$^2$ and associated in a bank of 400,000 cells would make it possible to obtain a production of hydrogen of the order of 2 × 10$^6$/m$^3$ per day under normal conditions of temperature and pressure. This corresponds to a production of 5 m$^3$ per 24 hours and per cell representing an acceptable investment and particularly favorable operating costs for a power consumption efficiency of 80%.

It is readily apparent that the invention is not limited to the examples of construction which have been more especially described in the foregoing with reference to the accompanying drawings but extends on the contrary to all alternative forms.

What we claim is:

1. A cell for the electrolysis of steam at high temperature, comprising a structure consisting of superposed film layers with at least two metallic elements insulated from each other for the supply of current respectively to a cathode and to an anode, wherein the cathode is formed by a substrate of a porous cermet to which is applied a thin film of solid electrolyte constituted by a mixture of refractory oxides in solid solution, said film of electrolyte being in turn coated with a porous deposit constituting the anode, current drainage between the metallic elements and the cathode and the anode being obtained on each side of the solid electrolyte by means of thicknesses of a conductive sponge.

2. An electrolytic cell according to claim 1, wherein the mixture of refractory oxides of the solid electrolyte is formed by dissolving a substance selected from calcium oxide, yttrium oxide, cerium oxide or a rare-earth oxide in zircnium dioxide.

3. An electrolytic cell according to claim 2, wherein the mixture of oxides corresponds to the formula
[$xZrO_2$, $(1 - x)$ CaO],
with $0.85 \leq x < 0.88$ 4. An electrolytic cell according to claim 1, wherein the porous cermet substrate of the cathode is constituted by a refractory support block having a compartmented structure in which the compartments are delimited by substantially prismatic internal spaces of substantial length which extend through the structure, the walls of said compartments being coated with a thin film of conductive metal having a constant thickness.

5. An electrolytic cell according to claim 4, wherein the support block has a honeycomb structure, and the honeycomb compartments have a cross-section which is hexagonal, square or of any other desired shape.

6. An electrolytic cell according to claim 4, wherein the walls of the support block compartments are provided with a thin coating of nickel.

7. An electrolytic cell according to claim 6, wherein the nickel coating has a thickness of the order of 0.1 mm.

8. An electrolytic cell according to claim 4, wherein the support block is in contact with the solid electrolyte by means of a coating of porous metal of small thickness which seals-off the ends of the honeycomb compartments.

9. An electrolytic cell according to claim 8, wherein the film layer is formed of porous nickel having a thickness of the order of 0.5 to 1 mm.

10. An electrolytic cell according to claim 8, wherein the connection between the solid electrolyte and the thin coating of the wall of the honeycomb compartments is formed by a fine-mesh wire fabric element placed against a contact face of the support block and embedded in the layer of porous metal.

11. An electrolytic cell according to claim 4, wherein the support block is formed of refractory material of the type consisting of stabilized zirconium, magnesium aluminate (spinel) or natural aluminum silicate (mullite) and has a thickness of approximately 3 to 5 mm.

12. An electrolyte cell according to claim 1, wherein the porous cermet of the cathode is constituted by the same oxide mixture as the electrolyte with addition of nickel.

13. An electrolytic cell according to claim 1, wherein the porous deposit of the anode is constituted by the same oxide mixture as the electrolyte with addition of a substance selected from the group of stannic oxide, indium oxide or antimony oxide.

14. An electrolytic cell according to claim 1, wherein the porous deposit of the anode is constituted by a layer of silicon carbide.

15. An electrolytic cell according to claim 14, wherein the silicon carbide layer contains precious metals.

16. An electrolytic cell according to claim 1, wherein the porous deposit of the anode is constituted by a mixture of zirconium oxide and calcium oxide containing a metal oxide selected from the group comprising indium or antimony, said metal oxide being doped with stannic oxide.

17. An electrolytic cell according to claim 1, wherein the conductive sponge is formed by means of an interlaced assembly of resilient wires.

18. An electrolytic cell according to claim 1, wherein the material constituting the conductive sponge is of refractory steel.

19. An electrolytic cell according to claim 1, wherein the material constituting the conductive sponge is a refractory alloy having a base of at least one metal selected from the group comprising nickel, chromium, molybdenum.

20. An electrolytic cell according to claim 1, wherein the conductive sponge is formed of composite fibers of carbon and/or silicon carbide.

21. An electrolytic cell according to claim 1, wherein the conductive sponge is formed of molybdenum silicide.

22. An electrolytic cell according to claim 1, wherein said cell has a geometry of revolution in the form of a glove finger which is closed at one end and is provided from the axis towards the periphery with an open central metallic tube which serves to supply current to the cathode and through which is circulated the steam to be electrolyzed, a first thickness of metallic sponge placed against the external surface of the central tube and extending beneath the extremity of said tube, an inner glove finger of porous cermet constituting the cathode one face of which is applied against the first thickness of metallic sponge and the opposite face of which is coated with a thin film of solid electrolyte, said film being in turn coated externally with a porous deposit which constitutes the anode, a second thickness of metallic sponge applied against the anode and finally an outer metallic casing tube in the form of a glove finger for supplying current to the anode.

23. An electrolytic cell according to claim 22, wherein the space formed between the central tube and the outer casing tube is divided into two compartments by means of a coaxial collar having two parallel shouldered portions rigidly fixed respectively to two flanges formed on the tube and the casing with interposition of a seal, said collar being such as to form an extension of the inner glove finger of porous cermet which forms the cathode by means of a metallic bellows seal, the compartments being intended to communicate respectively with two pipes for the discharge of hydrogen and oxygen produced by electrolysis of the steam.

24. An electrolytic cell according to claim 23, wherein the central tube is associated at the open end thereof within the cell with a spacer member of refractory material for centering said tube with respect to the glove finger of porous cermet.

25. An electrolytic cell according to claim 1, wherein said cell comprises a stack of unitary cells mounted between two parallel metallic current-supply plates and each unitary cell comprises successively a first thickness of metallic sponge, a film layer of porous cermet constituting the cathode in contact with a thin film of electrolyte which is in turn coated with a porous deposit forming the anode, a second thickness of metallic sponge and a conductive plate, the lateral spaces located on each side of the cathode and of the anode being so arranged as to constitute on one side a collector for supplying the steam and on the other side discharge collectors for the hydrogen and the oxygen produced.

26. An electrolytic cell according to claim 25, wherein the collectors are insulated at the level of the porous cermet layer by means of an annular insulating plate and an annular metallic conducting plate, said conducting plate being connected to the cathode by means of a metallic bellows seal.

27. An electrolytic cell according to claim 4 and claim 25, wherein the porous cermet support block of the cathode has a recessed central zone and a solid non-porous peripheral zone which directly ensures leak-tightness of the cell collectors.

28. An electrolytic cell according to claim 4, wherein the oxide mixture of the electrolyte layer is deposited on the porous cermet support block of the cathode in a thin film having low resistivity and a maximum thickness of 100 microns.

* * * * *